(12) United States Patent
Mahboubi et al.

(10) Patent No.: US 9,740,689 B1
(45) Date of Patent: Aug. 22, 2017

(54) SYSTEM AND METHOD FOR FARSI LANGUAGE TEMPORAL TAGGER

(71) Applicant: HRL Laboratories, LLC, Malibu, CA (US)

(72) Inventors: Pejman Mahboubi, Los Angeles, CA (US); Ryan F. Compton, New York, NY (US); Tsai-Ching Lu, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 15/215,564

(22) Filed: Jul. 20, 2016

Related U.S. Application Data (63) Continuation-in-part of application No. 14/295,101, filed on Jun. 3, 2014.

(60) Provisional application No. 62/195,275, filed on Jul. 21, 2015.

(51) Int. Cl.
| | |
|---|---|
| *G06F 17/30* | (2006.01) |
| *G06F 17/28* | (2006.01) |
| *G06F 17/21* | (2006.01) |
| *G06F 17/27* | (2006.01) |
| *G06F 17/22* | (2006.01) |

(52) U.S. Cl.
CPC ........ *G06F 17/2863* (2013.01); *G06F 17/218* (2013.01); *G06F 17/2223* (2013.01); *G06F 17/278* (2013.01)

(58) Field of Classification Search
None
See application file for complete search history.

(56) References Cited

U.S. PATENT DOCUMENTS

| | | | | |
|---|---|---|---|---|
| 8,583,432 | B1* | 11/2013 | Biadsy | G10L 15/063 704/10 |
| 2004/0100380 | A1* | 5/2004 | Lindsay | G06K 19/0717 340/540 |
| 2004/0111272 | A1* | 6/2004 | Gao | G06F 17/289 704/277 |
| 2004/0205670 | A1* | 10/2004 | Mitsugi | G06F 17/2765 715/256 |
| 2005/0131677 | A1* | 6/2005 | Assadollahi | G10L 15/22 704/201 |
| 2005/0240756 | A1* | 10/2005 | Mayer | G06F 9/4418 713/2 |
| 2007/0033221 | A1* | 2/2007 | Copperman | G06F 17/30616 |
| 2008/0140384 | A1* | 6/2008 | Landau | G06F 17/27 704/9 |
| 2011/0137636 | A1* | 6/2011 | Srihari | G06F 17/2863 704/2 |
| 2013/0041860 | A1 | 2/2013 | Lawrence | |

(Continued)

OTHER PUBLICATIONS

Mohseni et al., A Persian Part-of-Speech Tagger Based on Morphological Analysis, 2010.*

(Continued)

*Primary Examiner* — Syed Hasan
(74) *Attorney, Agent, or Firm* — Tope-McKay & Associates (57) ABSTRACT

Described is a system for automatic date detection in digital texts written in Farsi. The system includes a unique date tagger that reviews the string of texts and detect dates either compatible with the Farsi grammar or some popular yet unofficial ways of writing dates in Farsi.

18 Claims, 9 Drawing Sheets

(56) References Cited

U.S. PATENT DOCUMENTS

2014/0258197 A1    9/2014  Davulcu
2015/0278201 A1*  10/2015  Prokofyev .......... G06F 17/2872
                                                         704/2

OTHER PUBLICATIONS

Raja et al., Evaluation of Part of Speech Tagging on Persian Text, 2007.*
Seraji et al., A Statistical Part-of-Speech Tagger for Persian, 2011.*
Compton, Lee, De Silva, Lu, Macy, "Detecting future social unrest from unprocessed twitter data," IEEE ISI 2013, Jun. 4-7, 2013, Seattle, Washington, USA, pp. 56-60.
De Silva, Lalindra, and Ellen Riloff. "User Type Classification of Tweets with Implications for Event Recognition." Proceedings of the Joint Workshop on Social Dynamics and Personal Attributes in Social Media, pp. 98-108, Baltimore, Maryland USA, Jun. 27, 2014, 2014 Association for Computational Linguistics.
X. Zhu and Z. Ghahramani, "Learning from labeled and unlabeled data with label propagation," Technical Report CMU-CALD-02-107, Carnegie Mellon University, Tech. Rep., 2002.
Vincenty, Thaddeus, "Direct and inverse solutions of geodesics on the ellipsoid with application of nested equations," Survey Review 23.176 (1975): 88-93.
Vardi and Zhang, "The multivariate L1-median and associated data depth," Proceedings of the National Academy of Sciences, 97(4): 1423-6, 2000.
Compton et al., "Detecting future social unrest in unprocessed Twitter Data," IEEE Intelligence and Security Informatics, Jun. 4-7, 2013.
H. Kwak, C. Lee, H. Park, and S. Moon, "What is twitter, a social network or a news media?" WWW 2010, Apr. 26-30, 2010.
Office Action 1 for U.S. Appl. No. 14/295,101, dated Sep. 7, 2016.
Abel et al., Semantics+ Filtering+ Search= Twitcident Exploring Information in Social Web Streams, 2012, pp. 1-10.
Response to Office Action 1 for U.S. Appl. No. 14/295,101, dated Dec. 7, 2016.

* cited by examiner

Tomorrow: فردا      Today: امروز      Yesterday: دیروز

(NOTE: The use of a foreign language in the drawings is illustrative of the system which is directed to detecting dates in social media written in a *foreign* language)

(NOTE: The use of a foreign language in the drawings is illustrative of the system which is directed to detecting dates in social media written in a *foreign* language)

FIG. 6

زان از بعد ساله داد Twitter/rowzane
https://twitter.com/rowzane/status/13057152403 ▾
Apr 29, 2010 - و قم علیه جمهوری اسلامی علیه جهانی کارگر انقلاب به پیشنهاد روز جهانی کارگر از این بعد بزرگ داشت روز
http://bit.ly/bPMysO از گرامی و برای آزادی و برکشی

(NOTE: The use of a foreign language in the drawings is illustrative
of the system which is directed to detecting dates in social media written
in a *foreign* language)

FIG. 7

800 — [list of timestamps]

2013-10-12T18:59:42.000Z
2013-10-11T16:58:27.000Z
2013-10-25T09:59:14.000Z
2013-10-26T04:59:13.000Z
2013-10-13T10:58:18.000Z
2013-10-13T10:59:40.000Z
2013-10-28T10:59:11.000Z
2013-10-02T01:59:21.000Z
2013-10-13T12:58:48.000Z
2013-10-31T06:59:41.000Z
2013-10-19T09:59:09.000Z
2013-10-08T10:59:02.000Z
2013-10-05T21:58:00.000Z
2013-10-06T21:58:53.000Z
2013-10-05T21:59:36.000Z
2013-10-08T09:58:53.000Z
2013-10-11T05:57:35.000Z
2013-10-12T05:59:28.000Z
2013-10-27T21:59:03.000Z
2013-10-17T18:58:36.000Z

802 — [social media posts in foreign language]

FIG. 8

(NOTE: The use of a foreign language in the drawings is illustrative of the system which is directed to detecting dates in social media written in a *foreign* language)

FIG. 9

(NOTE: The use of a foreign language in the drawings is illustrative of the system which is directed to detecting dates in social media written in a *foreign* language)

SYSTEM AND METHOD FOR FARSI LANGUAGE TEMPORAL TAGGER

CROSS-REFERENCE TO RELATED APPLICATIONS

This is a Continuation-in-Part application of U.S. patent application Ser. No. 14/295,101, filed Jun. 3, 2014, the entirety of which is hereby incorporated by reference.

This is ALSO a non-provisional patent application of U.S. Provisional Application No. 62/195,275, filed on Jul. 21, 2015, the entirety of which is hereby incorporated by reference.

BACKGROUND OF INVENTION (1) Field of Invention

The present invention relates to a system for detecting dates in text and, more particularly, to a system for detecting dates in texts written in Persian (Farsi).

(2) Description of Related Art

Date detection is an important component of conceptual search in texts. While searching for content or content in text is important, it is often equally important to be able to automatically identify or detect relevant dates in streaming or online text or other text platforms (e.g., social media platforms, such as Twitter®). As can be appreciated, it is also desirable to be able to extract dates across dialects and languages.

To address this need, researchers have developed Spanish and Portuguese date extractors (see, Detecting future social unrest from unprocessed twitter data" Compton, Lee, De Silva, Lu, Macy, IEEE ISI 13, which is incorporated in its entirety by reference as though fully set forth herein). While operable for Spanish and Portuguese, the work of Compton et al. does not address date detection written in Farsi language.

More than 70 million Iranians speak in Farsi of which about 40% are between ages of 15 to 45. Despite all censorship by the Iranian government, according to Wikipedia®, "Iran experienced a great surge in Internet usage, and, with 20 million people on the Internet, currently has the second highest percentage of its population online in the Middle East, after Israel." As can be appreciated, such software is potentially of great use.

Although an algorithm for extracting dates in Spanish and Portuguese is available, very different structure and grammers of Persian make it impossible to use those software for Farsi in a trivial way. Unlike Spanish and Portuguese, the name of days of the week has two components that could be connected to each other, separated by a space or by a zero width non-joiner character.

Figure 1:
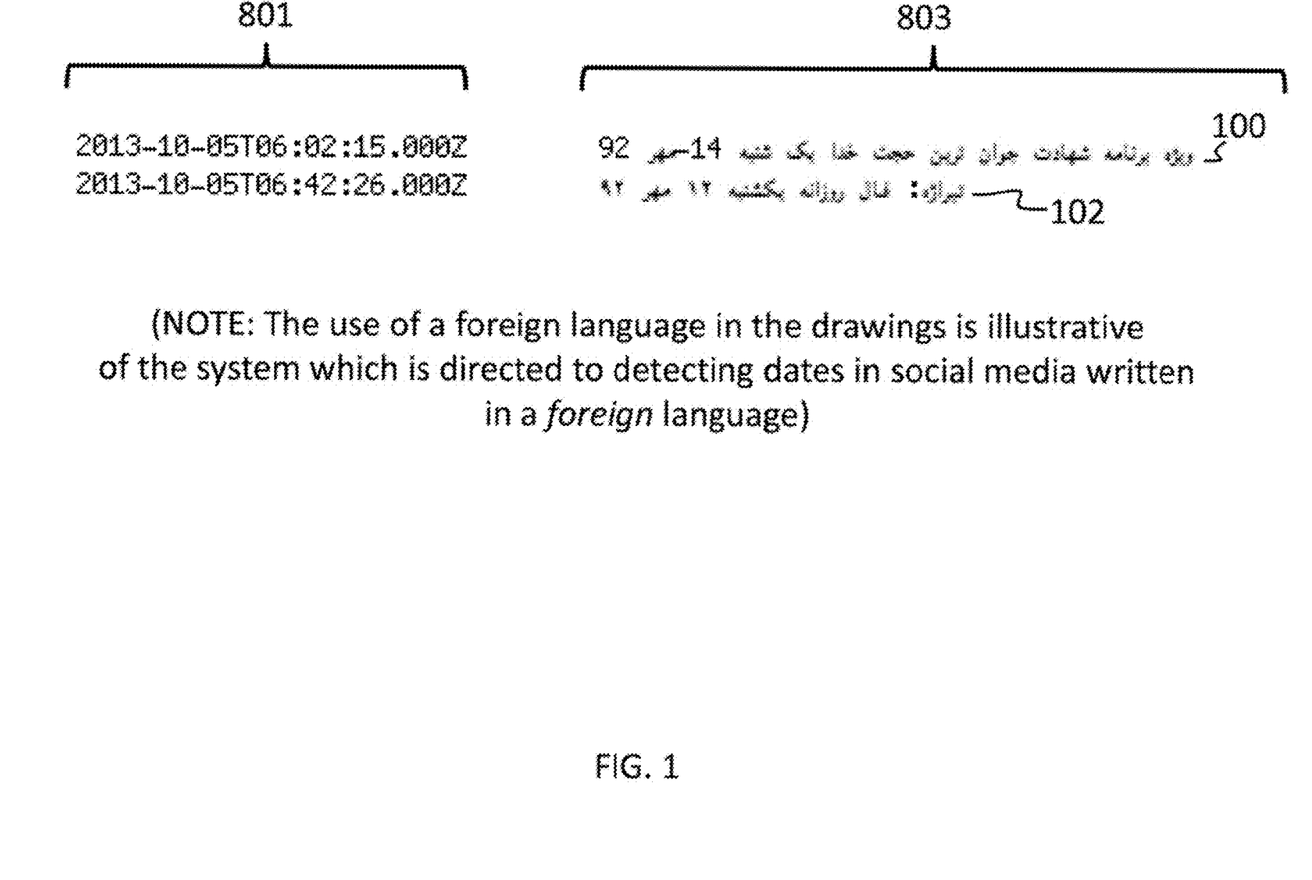
FIG. 1 is an illustration depicting two formats of writing a day of the week in Farsi.

FIG. 1, for example, shows two forms of writing Sunday in two Tweets® 101 and the corresponding date stamps (in the left column 103) or creation date of the Tweet®. Sunday is written with a space between its components in the the first Tweet® 100 and without a space in the second Tweet® 102. Since one of the components appears in the names of six days of the week, and the second component is a number, search for a name of the day requires more work than just looking for one name.

On the other hand, unlike the official way of writing dates in Farsi, people mention dates online in different ways. They might mention the name of the month from either Persian or Gregorian calendar, using the Persian alphabet; for more details on this method of writing see en.wikipedia.org/wiki/Fingilish. People might also write the numbers in English, while the name of the month are from Persian Calendar. All these challenges and many others make it impossible to apply the algorithm for Spanish and Portuguese to Farsi in a trivial way.

Thus, a continuing need exists for a system for temporally tagging (e.g., extracting dates) Farsi language text in a variety of platforms.

SUMMARY OF INVENTION

This disclosure provides a system for detecting dates in digital text written in Farsi. The system comprises one or more processors and a memory, the memory being a non-transitory computer-readable medium having executable instructions encoded thereon, such that upon execution of the instructions, the one or more processors perform operations of:

(a) receiving a string of digital text from a social media source;
(b) searching for a date in the string of digital text by searching for one of the words yesterday, today and tomorrow in Farsi as follows:
  a. if one of the words is found, then providing temporal textCreationDate tag for the text based on the date the digital text was created and the found word and then stopping for the string of digital text;
  b. if one of the words is not found, then continuing;
(c) performing a month search in the string of digital text by searching for a name of a month;
  a. if a name of the month is found, then performing a day of the month search;
    i. if a day of the month is found, then converting the day of the month to Gregorian calendar and logging the day of the month;
    ii. if a day of the month is not found, then stopping;
  b. if a name of the month is not found, then continuing;
(d) performing a weekday name search by looking for weekday names within the string of text followed by a word in Farsi having a meaning of "next";
  a. if a weekday name is found following by a word in Farsi having a meaning of "next," then identifying a date for a first occurrence of name of a weekday after the date the digital text was created;
  b. if a weekday name is not found, then continuing;
(e) searching for a year-month-date label in the string of digital text;
  a. if a year-month-date label is not found, then stopping;
  b. if a year-month-date label is found, then continuing; and
(f) converting the year-month-date label to Gregorian calendar and logging the day of the month.

In another aspect, the system performs operations of notifying an operator of the day of the month.

Additionally, performing the month search further includes searching for names of the month from both Persian and Gregorian calendars and French pronunciations of Gregorian month names.

In yet another aspect, the system receives the string of digital text from the social media source as a data stream greater than 1 megabyte per minute.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for detecting dates in text and, more particularly, to a system for detecting dates in texts written in Persian (Farsi). The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(1) Principal Aspects

Various embodiments of the invention include three "principal" aspects. The first is a system for detecting dates in text written in Persian (Farsi). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 2:
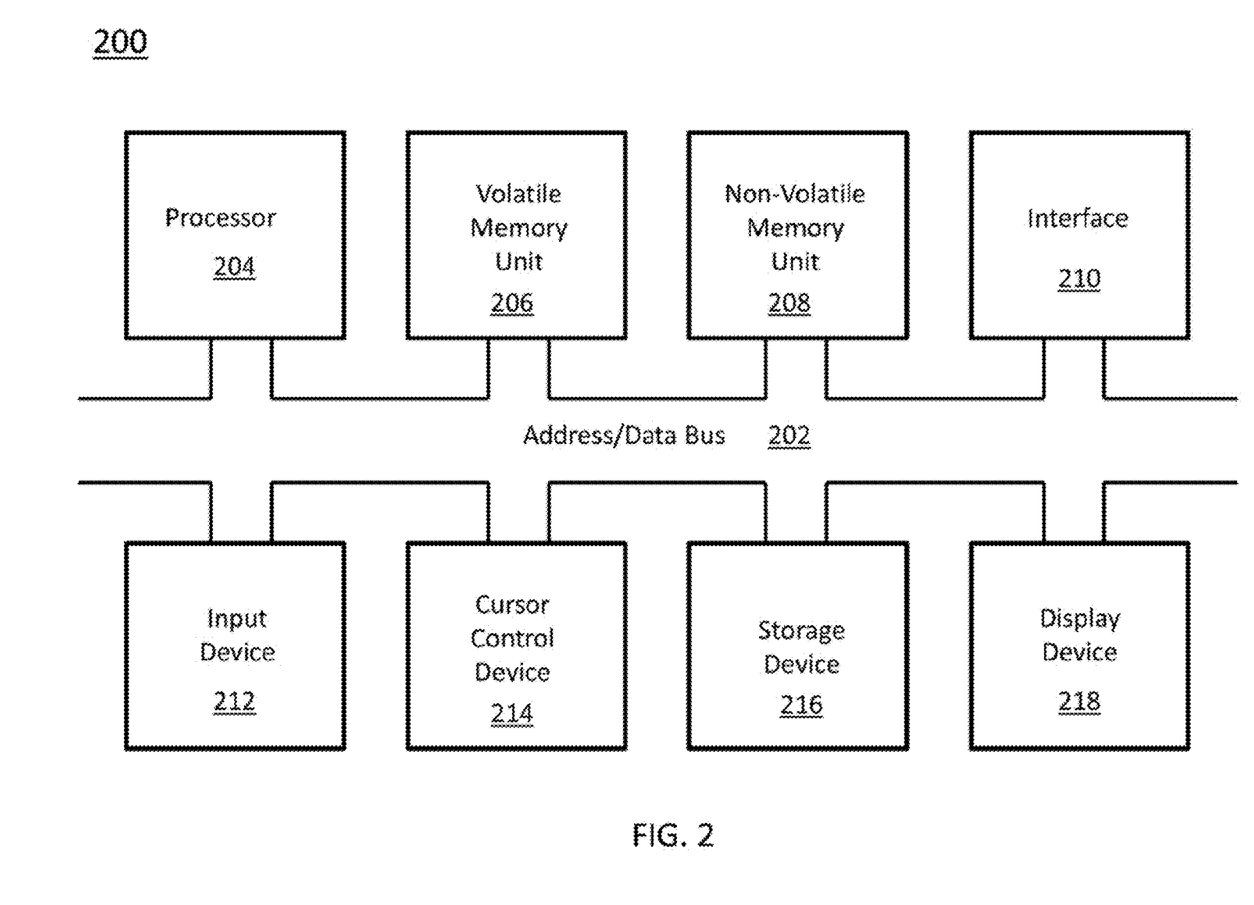
FIG. 2 is a block diagram depicting the components of a system according to various embodiments of the present invention.

A block diagram depicting an example of a system (i.e., computer system 200) of the present invention is provided in FIG. 2. The computer system 200 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 200. When executed, the instructions cause the computer system 200 to perform specific actions and exhibit specific behavior, such as described herein.

The computer system 200 may include an address/data bus 202 that is configured to communicate information. Additionally, one or more data processing units, such as a processor 204 (or processors), are coupled with the address/data bus 202. The processor 204 is configured to process information and instructions. In an aspect, the processor 204 is a microprocessor. Alternatively, the processor 204 may be a different type of processor such as a parallel processor, application-specific integrated circuit (ASIC), programmable logic array (PLA), complex programmable logic device (CPLD), or a field programmable gate array (FPGA).

The computer system 200 is configured to utilize one or more data storage units. The computer system 200 may include a volatile memory unit 206 (e.g., random access memory ("RAM"), static RAM, dynamic RAM, etc.) coupled with the address/data bus 202, wherein a volatile memory unit 206 is configured to store information and instructions for the processor 204. The computer system 200 further may include a non-volatile memory unit 208 (e.g., read-only memory ("ROM"), programmable ROM ("PROM"), erasable programmable ROM ("EPROM"), electrically erasable programmable ROM "EEPROM"), flash memory, etc.) coupled with the address/data bus 202, wherein the non-volatile memory unit 208 is configured to store static information and instructions for the processor 204. Alternatively, the computer system 200 may execute instructions retrieved from an online data storage unit such as in "Cloud" computing. In an aspect, the computer system 200 also may include one or more interfaces, such as an interface 220, coupled with the address/data bus 202. The one or more interfaces are configured to enable the computer system 200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 200 may include an input device 212 coupled with the address/data bus 202, wherein the input device 212 is configured to communicate information and command selections to the processor 200. In accordance with one aspect, the input device 212 is an alphanumeric input device, such as a keyboard, that may include alphanumeric and/or function keys. Alternatively, the input device 212 may be an input device other than an alphanumeric input device. In an aspect, the computer system 200 may include a cursor control device 214 coupled with the address/data bus 202, wherein the cursor control device 214 is configured to communicate user input information and/or command selections to the processor 200. In an aspect, the cursor control device 214 is implemented using a device such as a mouse, a track-ball, a track-pad, an optical tracking device, or a touch screen. The foregoing notwithstanding, in an aspect, the cursor control device 214 is directed and/or activated via input from the input device 212, such as in response to the use of special keys and key sequence commands associated with the input device 212. In an alternative aspect, the cursor control device 214 is configured to be directed or guided by voice commands.

In an aspect, the computer system 200 further may include one or more optional computer usable data storage devices, such as a storage device 216, coupled with the address/data bus 202. The storage device 216 is configured to store information and/or computer executable instructions. In one aspect, the storage device 216 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 218 is coupled with the address/data bus 202, wherein the display device 218 is configured to display video and/or graphics. In an aspect, the display device 218 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 200 presented herein is an example computing environment in accordance with an aspect. However, the non-limiting example of the computer system 200 is not strictly limited to being a computer system. For example, an aspect provides that the computer system 200 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 3:
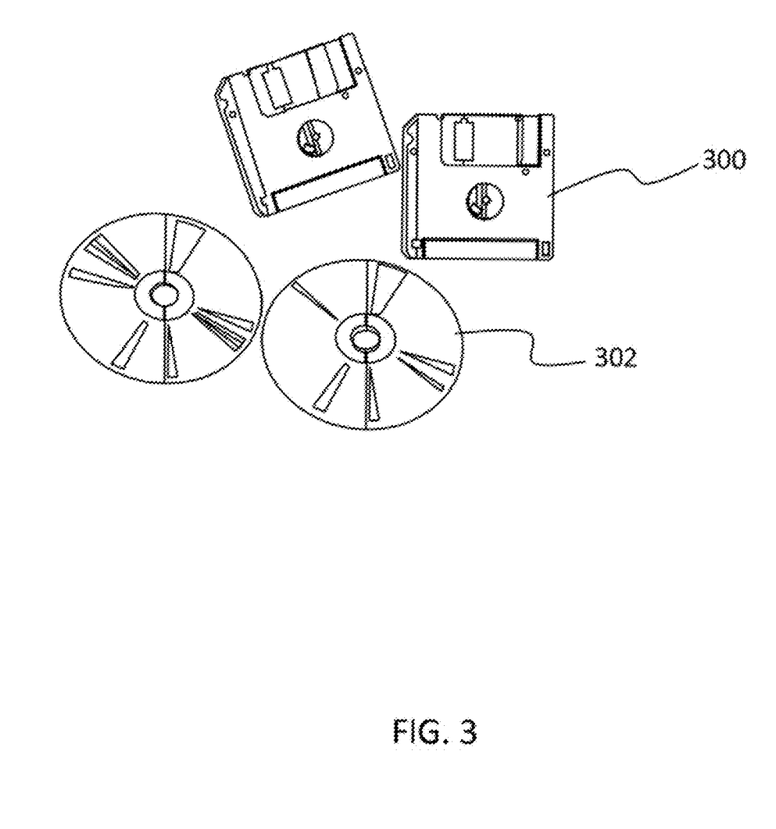
FIG. 3 is an illustration of a computer program product embodying an aspect of the present invention.

An illustrative diagram of a computer program product (i.e., storage device) embodying the present invention is depicted in FIG. 3. The computer program product is depicted as floppy disk 300 or an optical disk 302 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

This disclosure is directed to the design and implementation of an algorithm for automatic date detection in digital texts, such as Twitter®, Facebook®, etc. More specifically, the system detects dates in texts written in Persian (Farsi). Hash tables farsiSolarMonthIndexMap, farsiGregorianMonthIndexMap and a regular expression called twoFarsiNumbersRegexp are among important components of the system and method. A key aspect of the system is the unique DateTagger algorithm that detect dates either compatible with the Farsi grammar or some popular yet unofficial ways of writing dates in Farsi. This system and method is the first such process written specifically for this purpose in Farsi and is a key component for all date relevant analysis of Farsi Tweets®. The system can be employed for a variety of uses, including government programs for national intelligence, marketing systems, etc. Specific details regarding the system and method are provided below.

(4) Specific Details of Various Embodiments

Figure 4:
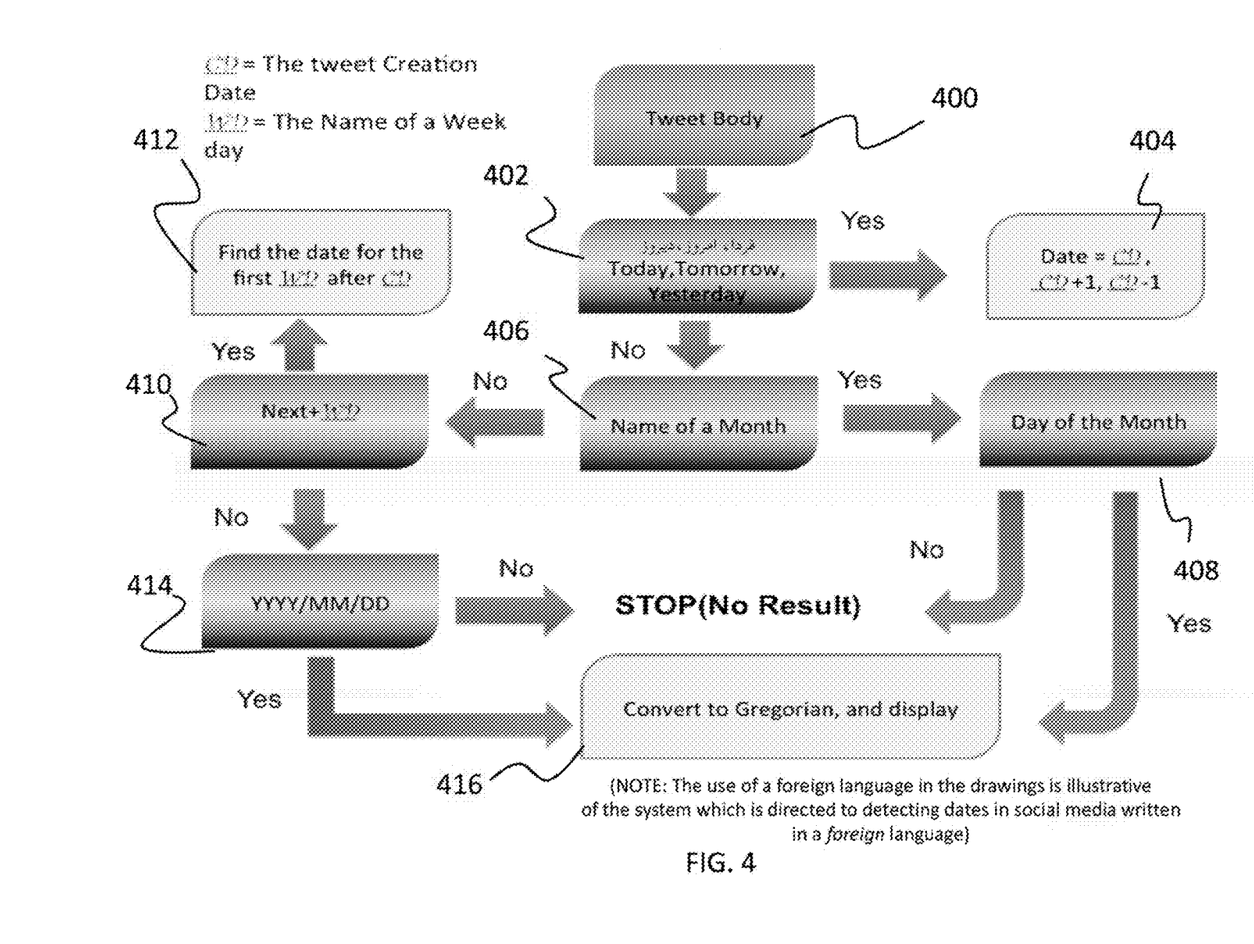
FIG. 4 is a flowchart depicting a process for finding a date in the text according to various embodiments of the present invention.
Figure 5:
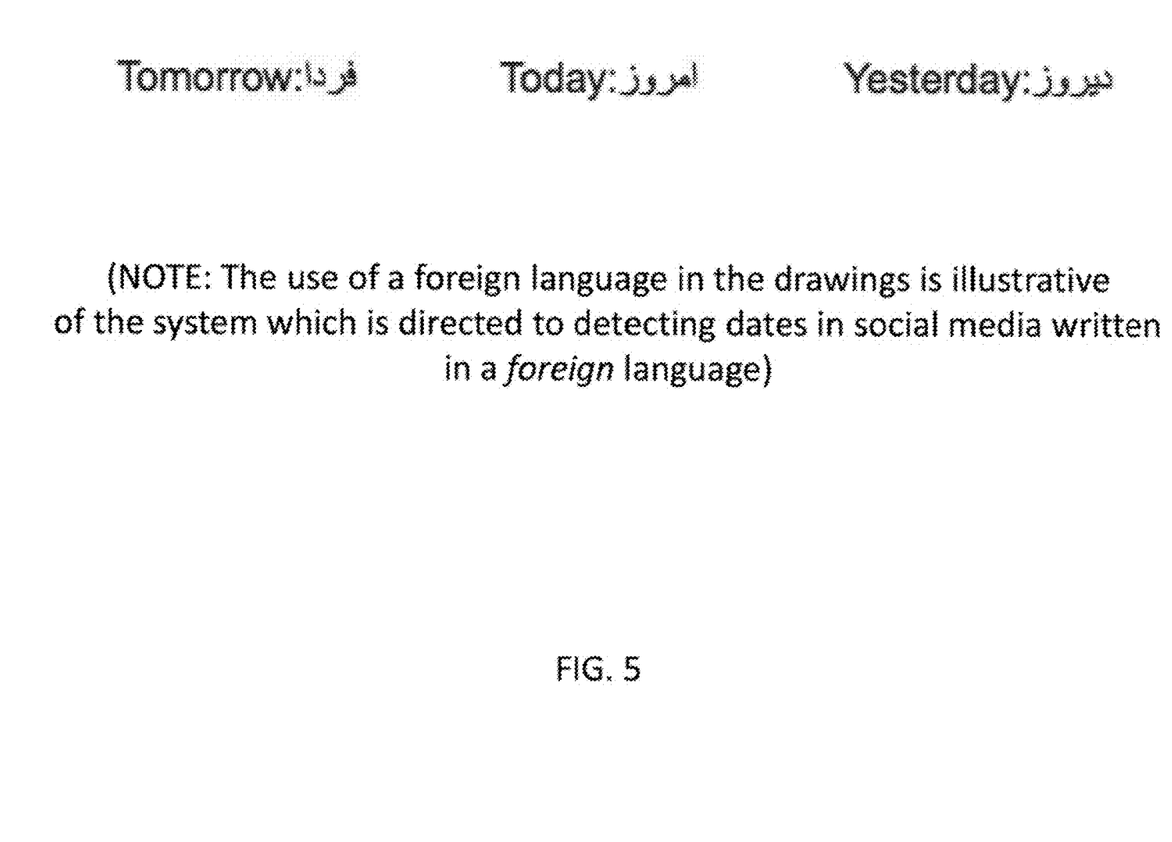
FIG. 5 is an illustration depicting "Tomorrow", "Today", and "Yesterday" in Farsi.

As noted above, this disclosure provides a system that automatically detects dates in digital texts written in Persian (Farsi). As shown in FIG. 4, the system starts by receiving a string of digital text 400. As a non-limiting example, the string of digital text 400 is a Tweet®. The system then begins is search for a date 402 by looking for the simplest cases (i.e., searching first for one of the three words, Yesterday, Today and Tomorrow in Farsi (an example of which is shown in FIG. 5)). If one of the three words is found, the system provides a temporal textCreationDate tag 404 for the text as textCreationDate−1, textCreationDate, and textCreationDate+1, accordingly. Here, the textCreationDate refers to the date at which the text file was created.

Figure 6:
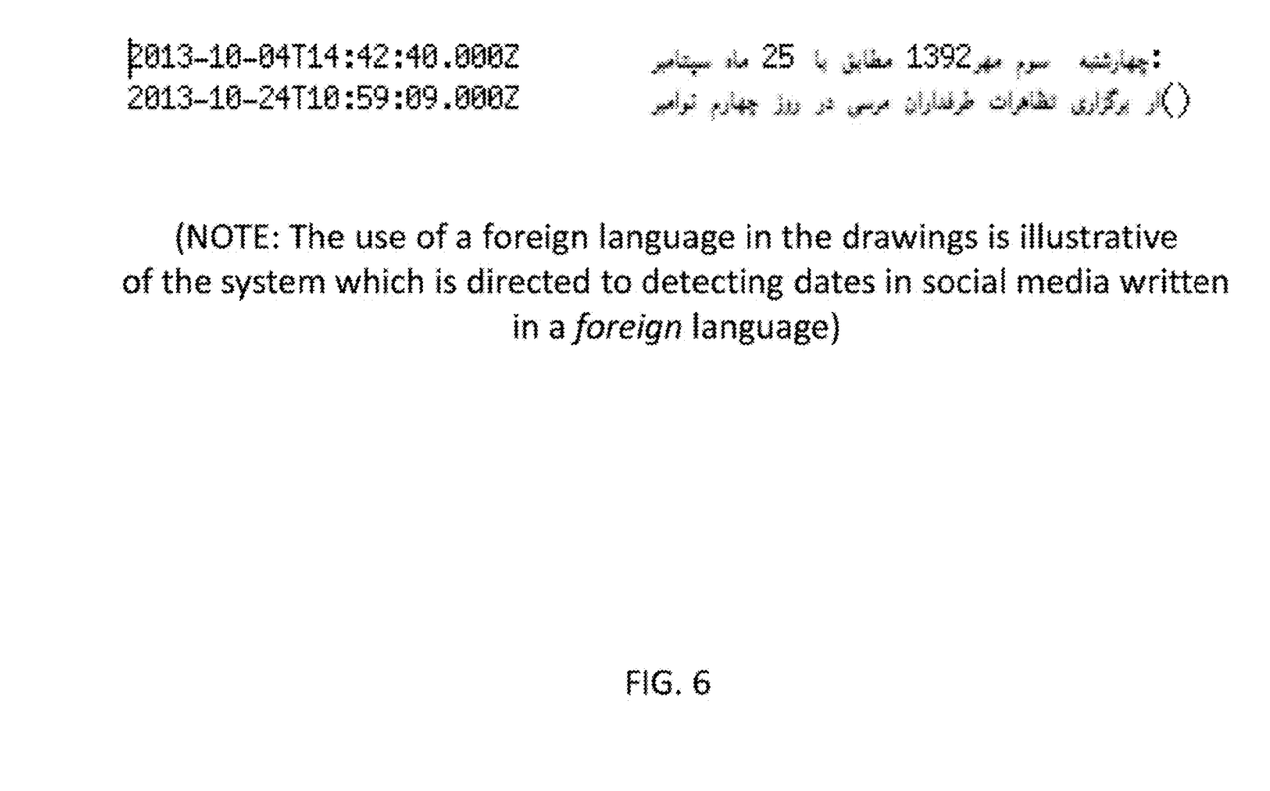
FIG. 6 is an illustration depicting how names of the month are sometimes written in Farsi from the Gregorian calendar.

In case none of the above was found, the system continuous by performing a month search 406 by searching for the name of a month. Persian-speaking users have a tendency to use Gregorian calendar in addition to Persian calendar. In doing so, they sometimes mention the name of the month of the Gregorian calendar. For example, in the Tweet® as shown in FIG. 6, it is shown that the user writes using the Farsi alphabet, September 25 and November 4, respectively, in his Tweets®.

Figure 7:
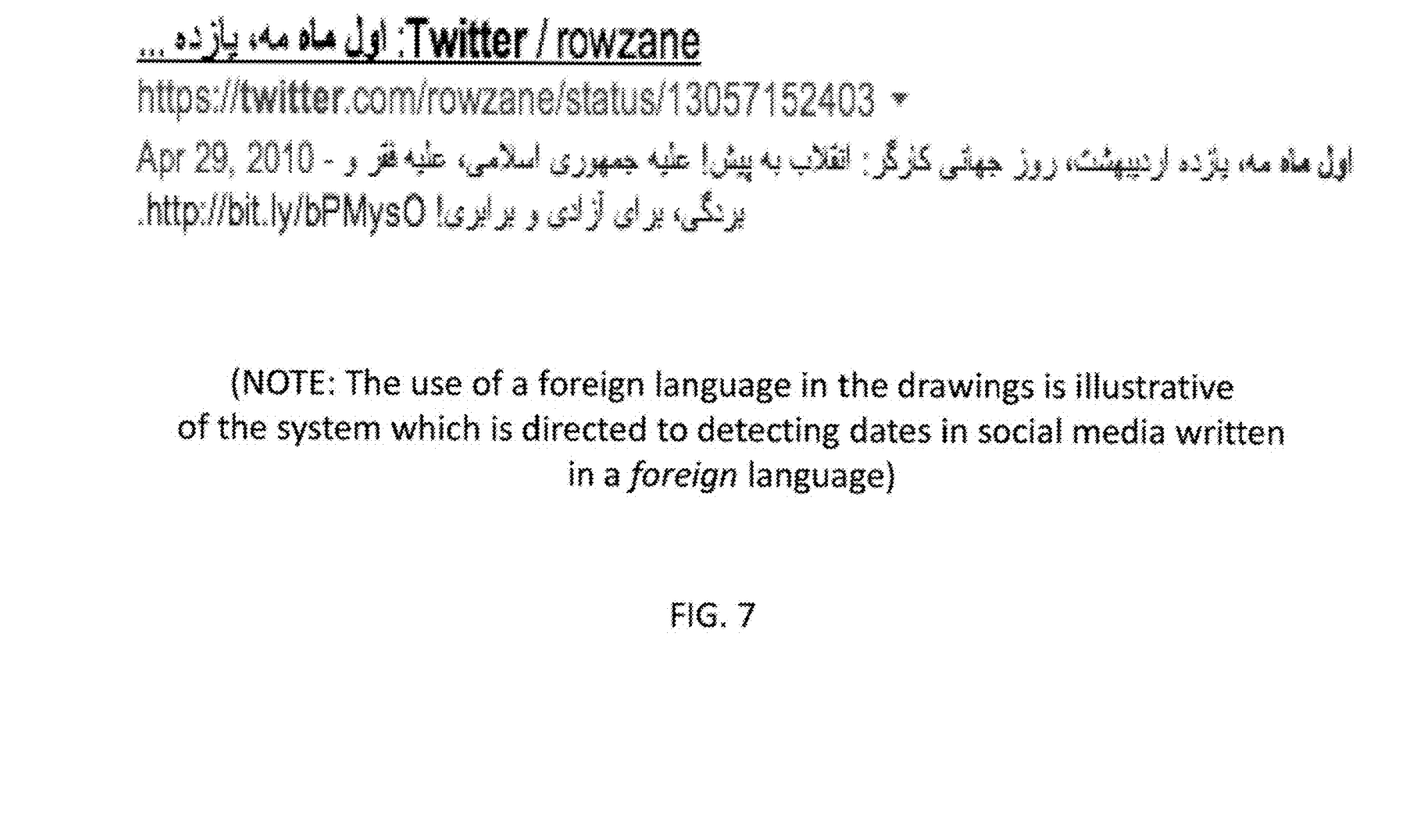
FIG. 7 is an example of a Gregorian month name, written in accord with its French pronunciation.

In the month search 406, the system searches for names of the month from both Persian and Gregorian calendars. The system also looks for the French pronunciations of the Gregorian month names, which are more common in the older Iranian generations, and are occasionally found in texts and Tweets®. For example, FIG. 7 provides an example in which the user writes, using the Farsi alphabet, the French pronunciation of month May, i.e., Mai. Thus, in this example, the Gregorian month name is written in accord with its French pronunciation.

If the name of the month is detected, then the system performs a day of the month search 408, by, for example, finding the spelling/writing of the day of the month. If a day of the month is found, then the date is converted to Gregorian calendar 416. The date is also optionally filtered based on its mention date to creation date. For example, the system computes the distance of the day of the month to the file creation date. If the result is bigger than 40 days (or any other predetermined filter out date), the date (day of the month) is filtered out. Otherwise, the day of the month is logged and/or reported to a user or operator.

If no name was discovered, the system continues by looking for the names of the weekdays 410. This task is also more challenging than the corresponding task for the Gregorian calendar. Unlike in English, the ZERO WIDTH NON-JOINER--ZWNJ--(u200c) is used frequently in Farsi. It usually loins two components of a combined word. Names of the days of the week are examples of such combinations. For example, Sunday and Thursday have the following three alternative forms:

| | | |
|---|---|---|
| 1 - NO SPACE: | پنجشنبه | یکشنبه |
| 2 - WITH ZWNJ: | پنج‌شنبه | یک‌شنبه |
| 3 - WITH SPACE: | پنج شنبه | یک شنبه |

By replacing all the ZWNJ characters in a given string by a space character, the search is reduced to only two alternative forms. It is also noted that the first word from left (i.e., شنبه) is common between Sunday and Thursday. This word is common in 6 days of the week except for Friday: جمعه Note that Farsi is written from right to left, and because of that counting from right would be more natural; see class PersianCalendarConstants.java for some examples of the strings in Unicode.

The name of a weekday, by itself, cannot specify a date. However, together with an adjective such as "This", "next" or "last", it can translate into a date. For this purpose, the system looks for the names of the weekdays 410 by looking for either of the following words (both equivalent to the word "next") after the name of the weekday:

آینده    بعد

The above words are translated as "future" or "after, respectively.

If either of the words are identified, then the system finds the date 412 by finding the date for the first name of a weekday after the Tweet® creation date.

If no dates were found, the system proceeds by finally searching for a year-month-date label 414. In other words, the system searches the text for a YYYY/MM/dd format, which is the counterpart of the Gregorian date format MM/dd/YYYY. Since all the digits are written in Persian, some adjustment were made to the original date regex in the java programming language to find this pattern. The regex in java is written as follows:

twoFarsiNumbersRegexp="[۱۲۳]?[۰۱۲۳۴۵۶۷۸۹]";

The last step in the process is filtering. Desirably, only recent dates are considered. For example, the system can be setup to only consider the dates in at most 40 days (or any other predetermined number of days) from the file creation date. As in the Spanish and Portuguese date extractor, it is assumed that the year of the date is never mentioned in the text. The date is set to equal either YYYY, YYYY+1, or YYYY−1, where YYYY is the file creation date. However, the way this method is applied to Persian dates needs a bit more care, when dates mentioned in the text are not in Gregorian calendar. To find the year, the system first converts the creation date to the Persian calendar and extracts the year YYYY, and considers it along with YYYY+1, and YYYY−1, as candidates for the year of the date mentioned in the text. The system then converts all three dates to Gregorian calendar 416 and computes their distance to the file creation date. At most, one the three results can be less than 40 days (or any other pre-selected filter date. If all of the three results were bigger than 40 days, the date is filtered out. Otherwise, the year of the date is determined to be the unique year that resulted in a distance less than 40 and the date is logged and/or reported to a user or operator (e.g., via text, email, a display on a screen, etc.)

Figure 8:
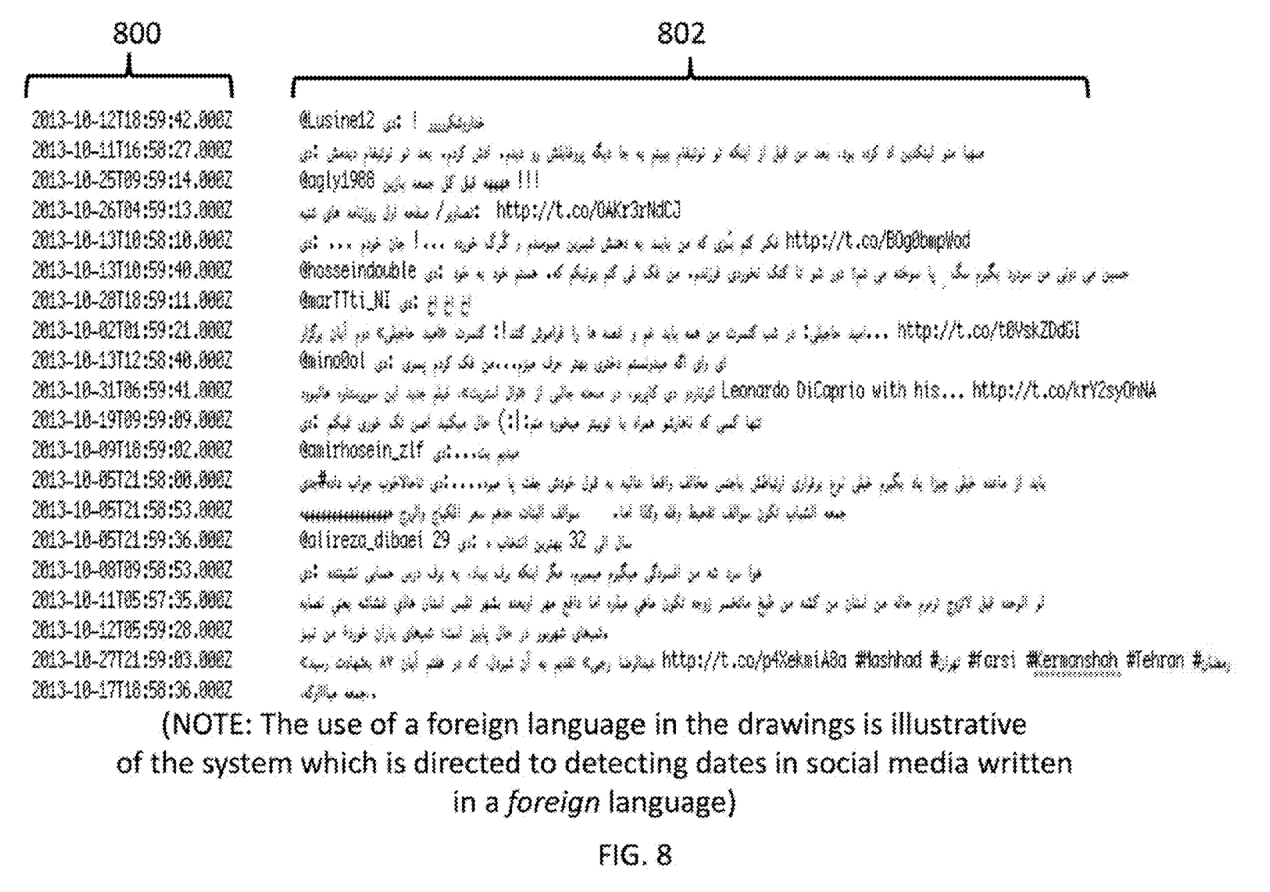
FIG. 8 is an illustration depicting sample Tweets® in Farsi, where the first column is the creation date, and the second column is the Tweet® body.

For further understanding, FIG. 8 provides a sample of Tweets® in Farsi as may be input into the system. The first column 800 is the creation date or time stamp of the corresponding Tweet® when created, and the second column 802 is the Tweet® body or text string. After passing through the system, the output is a temporal tag that is associated with a date mentioned in a particular string of text or Tweet®. For example and as shown in FIG. 9, the first column 900 is the date mentioned in the text, the second column 902 is the creation date, and the third column 904 is the Tweet® body or text string.

(4.1) Example Implementation

For further understanding, provided below is a non-limiting example of a commercial implementation of the system as described herein. For example, the system can be implemented as software that is sold to entities that wish to monitor Farsi digital text and identify dates associated with the text and particular keywords that are indicative of unrest or illegal activity. In this example implementation, the software would be loaded into an internet enabled computer. Once loaded, the system is activated and is linked with streaming Tweet® data (or any other social media network) through a streaming API that provides access to Twitter's® global stream of Tweet® data. All Tweet® bodies are passed through the process as outlined above with respect to FIG.

Figure 9:
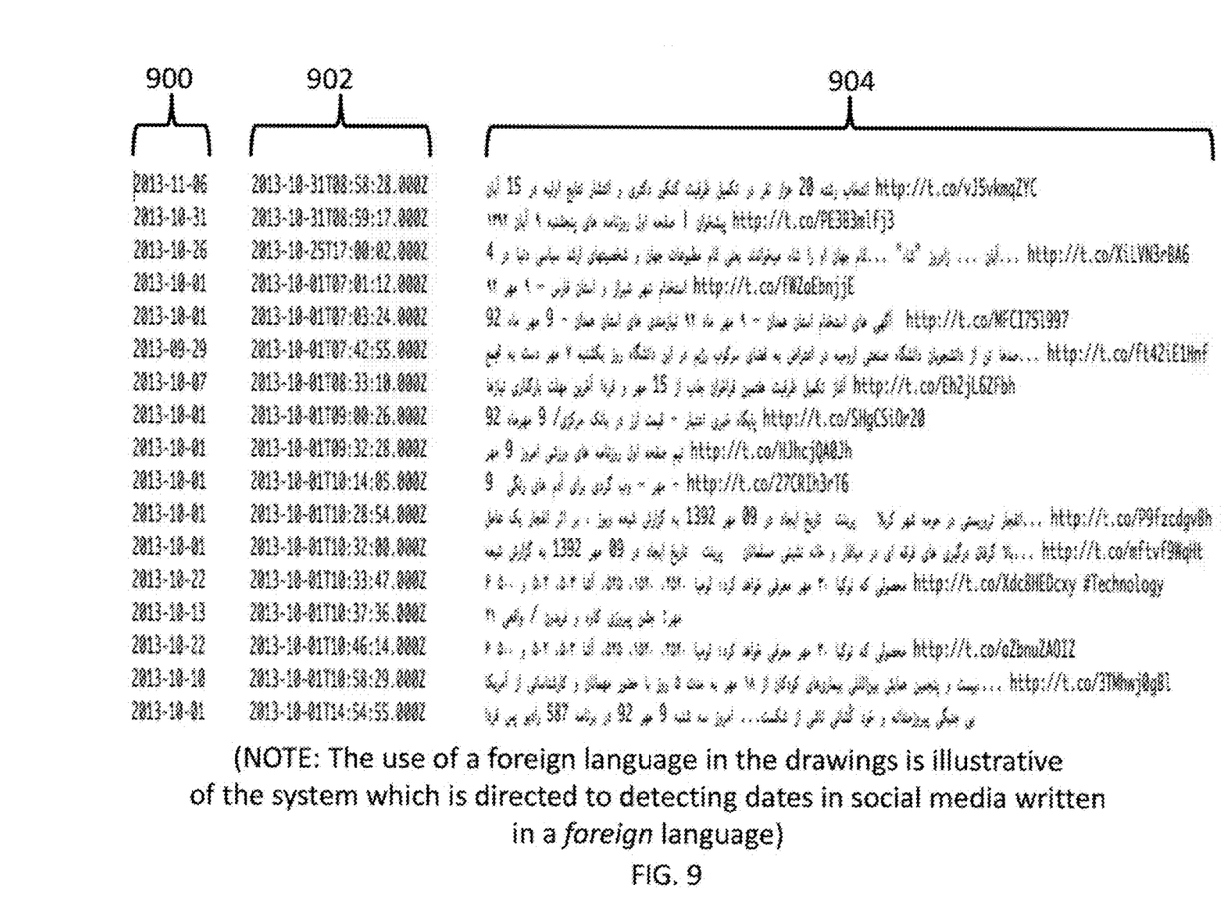
FIG. 9 is an illustration of a sample output as provided according to various embodiments of the present invention, where the first column is the date mentioned in the text, the second column is the creation date, and the third column is the Tweet® body

4 to generate a log that associates a date mentioned in the text with the corresponding text (an example of which is shown in FIG. 9). In reviewing the streaming digital text, the system can also be enabled to flag keywords that are indicative of unrest of illegal activity, such as "riot", "protest", "kill", "drugs", etc. If the system identifies keywords that are indicative of unrest or illegal activity and if a date is mentioned in the text as associated with those keywords, then an operator or user is notified using, any notification technique (e.g., email, log, display on a screen, text, etc).

As another example, the system as described herein can be added to other systems that mine social media data for early detection of newsworthy civil unrest events. For example, U.S. patent application Ser. No. 14/295,101, entitled, "Social Media Data Mining For Early Detection Of Newsworthy Civil Unrest Events", the entirety of which is incorporated herein by reference, is a system that uses keyword filters to monitor digital text for civil unrest events. The system as described herein can be incorporated into the system of U.S. patent application Ser. No. 14/295,101 to monitor digital text in Farsi and provide the relevant dates as identified that may be mentioned in the Tweet® body and that includes text that is identified as being indicative of social unrest.

In both examples as provided above, it is noted that the mere volume of data, such as that provided in Twitter's® global stream of Tweet® data, means that the process can only practically be performed using a computer that is linked to a computer network and/or the internet in other words, the vast volume of data in a streaming global interact network creates a problem specifically arising in the realm of computer networks. For example, in operation, the system ingests and processes approximately 3.8 terabytes (TB) of Twitter Decahose data per month (or 86.7 megabytes (MB) per minute). Thus, as can be appreciated by the vast volume of data, the system is operable for processing approximately 86.7 MB of streaming Twitter data per minute and, desirably, must be operable for processing a minimum of 1 MB of Twitter streaming data per minute. Using the Twitter data, the system can perform Daily ElasticSearch indexing with a processing performance of approximately one hour and 45 minutes (meaning indexing "contents" of daily tweets). Further, the system can daily TUBED processing of the Twitter data in approximately 13 minutes (meaning processing indexed Tweet contents with time coding (including Farsi time coding) and other filters for protest prediction). Thus, the solution as provided by the system and method of this disclosure is necessarily rooted in computer technology.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting dates in digital text written in Farsi, the system comprising:
one or more processors and a memory, the memory being a non-transitory computer-readable medium having executable instructions encoded thereon, such that upon execution of the instructions, the one or more processors perform operations of:
(g) receiving a string of digital text from a social media source;
(h) searching for a date in the string of digital text by searching for one of the words yesterday, today and tomorrow in Farsi as follows:
   a. if one of the words is found, then providing temporal textCreationDate tag for the text based on the date the digital text was created and the found word and then stopping for the string of digital text;
   b. if one of the words is not found, then continuing;
(i) performing a month search in the string of digital text by searching for a name of a month;
   a. if a name of the month is found, then performing a day of the month search;
      i. if a day of the month is found, then converting the day of the month to Gregorian calendar and logging the day of the mouth;
      ii. if a day of the month is not found, then stopping;
   b. if a name of the month is not found, then continuing;
(j) performing a weekday name search by looking for weekday names within the string of text followed by a word in Farsi having a meaning of "next";
   a. if a weekday name is found following by a word in Farsi having a meaning of "next," then identifying a data for a first occurrence of name of a weekday after the date the digital text was created;
   b. if a weekday name is not found, then continuing;
(k) searching for a year-month-date label in the string of digital text;
   a. if a year-month-date label is not found, then stopping;
   b. if a year-month-date label is found, then continuing; and
(l) convening the year-month-date label to Gregorian calendar and logging the day of the month.

2. The system as set forth in claim 1, further performing operations of notifying an operator of the day of the month.

3. The system as set forth in claim 2, wherein performing the month search further includes searching, for names of the month from both Persian and Gregorian calendars and French pronunciations of Gregorian month names.

4. The system as set forth in claim 3, wherein the system receives the string of digital text from the social media source as a data stream greater than 1 megabyte per minute.

5. The system as set forth in claim 1, wherein performing the month search further includes searching for names of the month from both Persian and Gregorian calendars and French pronunciations of Gregorian month names.

6. The system as set forth in claim 1, wherein the system receives the string of digital text from the social media source as a data stream greater than 1 megabyte per minute.

7. A method for detecting dates in digital text written in Farsi, the method comprising operation of:
(a) receiving, with one or more processors, a string of digital text from a social media source;
(b) searching, with the one or more processors, for a date in the string of digital text by searching for one of the words yesterday, today and tomorrow in Farsi as follows:
   a. if one of the words is found, then providing temporal textCreationDate tag for the text based on the date the digital text was created and the found word and then stopping for the string of digital text;
b. if one of the words is not found, then continuing;
(c) performing, by the one or more processors, a month search in the string of digital text by searching for a name of a month;
  a. if a name of the month is found, then performing a day of the month search;
    i. if a day of the month is found, then converting the day of the month to Gregorian calendar and logging the day of the month;
    ii. if a day of the month is not found, then stopping;
  b. if a name of the month is not found, then continuing;
(d) performing, by the one or more processors, a weekday name search by looking for weekday names within the string of text followed by a word in Farsi having a meaning of "next";
  a. if a weekday name is found following by a word in Farsi having a meaning of "next," then identifying a date for a first occurrence of name of a weekday after the date the digital text was created;
  b. if a weekday name is not found, then continuing;
(e) searching, by the one or more processors, for a year-month-date label in the string of digital text;
  a. if a year-month-date label is not found, then stopping;
  b. if a year-month-date label is found, then continuing; and
(f) convening, by the one or more processors, the year-month-date label to Gregorian calendar and logging the day of the month.

8. The method as set forth in claim 7, further performing operations notifying an operator of the day of the month.

9. The method as set forth in claim 8, wherein performing the month search further includes searching for names of the month from both Persian and Gregorian calendars and French pronunciations of Gregorian month names.

10. The method as set forth in claim 9, wherein in receiving the string of digital text, the string of digital text is received from the social media source as a data stream greater than 1 megabyte per minute.

11. The method as set forth in claim 7, wherein performing the month search further includes searching for names of the month from both Persian and Gregorian calendars and French pronunciations of Gregorian month names.

12. The method as set forth in claim 7, wherein in receiving the string of digital text, the string of digital text is received from the social media source as a data stream greater than 1 megabyte per minute.

13. A computer program product for detecting dates in digital text written in Farsi, the computer program product comprising:
  a non-transitory computer-readable medium having executable instructions encoded thereon, such that upon execution of the instructions by one or more processors, the one or more processors perform operations of:
  (a) receiving a string of digital text from a social media source;
  (b) searching for a date in the string of digital text by searching for one of the words yesterday, today and tomorrow in Farsi as follows:
    a. if one of the words is found, then providing temporal textCreationDate tag for the text based on the date the digital text was created and the found word and then stopping for the string of digital text;
    b. if one of the words is not found, then continuing;
  (c) performing a month search in the string of digital text by searching for a name of a month;
    a. if a name of the month is found, then performing a day of the month search;
      i. if a day of the month is found, then converting the day of the month to Gregorian calendar and logging the day of the month;
      ii. if a day of the month is not found, then stopping;
    b. if a name of the month is not found, then continuing;
  (d) performing a weekday name search by looking for weekday names within the string of text followed by a word in Farsi having a meaning of "next";
    a. if a weekday name is found following by a word in Farsi having a meaning of "next," then identifying a date for a first occurrence of name of a weekday alter the date the digital text was created;
    b. if a weekday name is not found, then continuing;
  (e) searching for a year-month-date label in the string of digital text;
    a. if a year-month-date label is not found, then stopping;
    b. if a year-month-date label is found, then continuing; and
  (f) converting the year-month-date label to Gregorian calendar and logging the day of the month.

14. The computer program product as set forth in claim 13, further comprising instructions fort causing the one or more processors to performing operations of notifying an operator of the day of the month.

15. The computer program product as set forth in claim 14, wherein performing the month search further includes searching for names of the month from both Persian and Gregorian calendars and French pronunciations of Gregorian month names.

16. The computer program product as set forth in claim 15, wherein in receiving the string of digital text, the string of digital text is received from the social media source as a data stream greater than 1 megabyte per minute.

17. The computer program product as set forth in claim 13, wherein performing the month search further includes searching for names of the month from both Persian and Gregorian calendars and French pronunciations of Gregorian month names.

18. The computer program product as set forth in claim 13, wherein in receiving the string of digital text, the string of digital text is received from the social media source as a data stream greater than 1 megabyte per minute.

\* \* \* \* \*